E. HAMMARSTROM.
PRESSURE SAFETY TRIPPER.
APPLICATION FILED JUNE 26, 1917.
1,304,965.
Patented May 27, 1919.
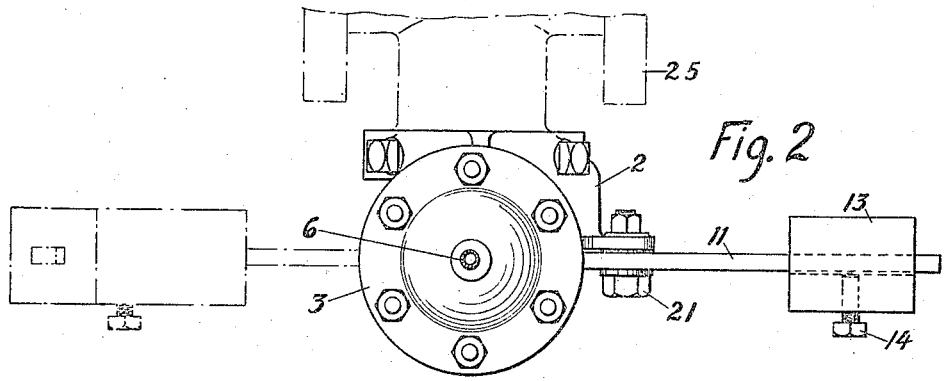
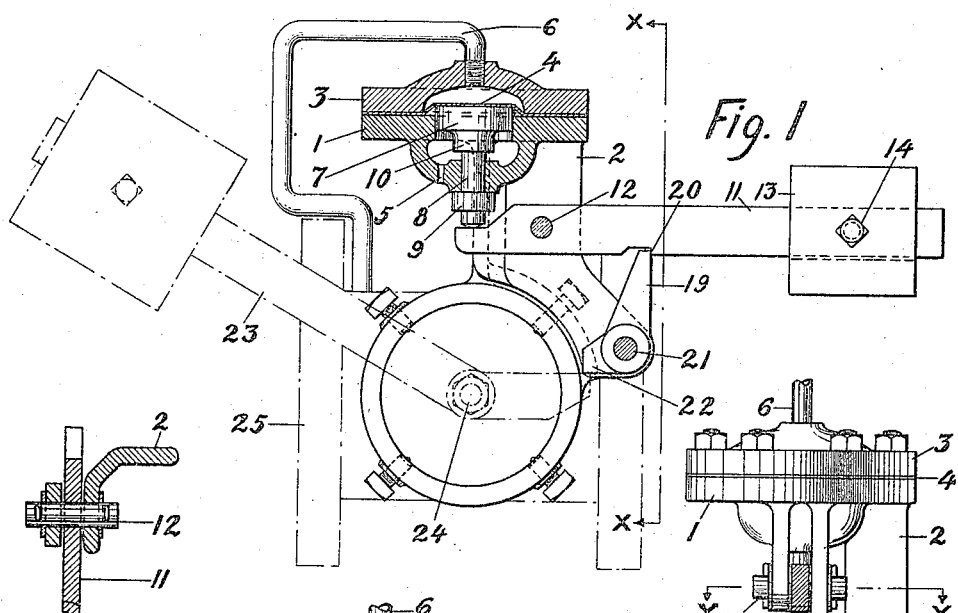
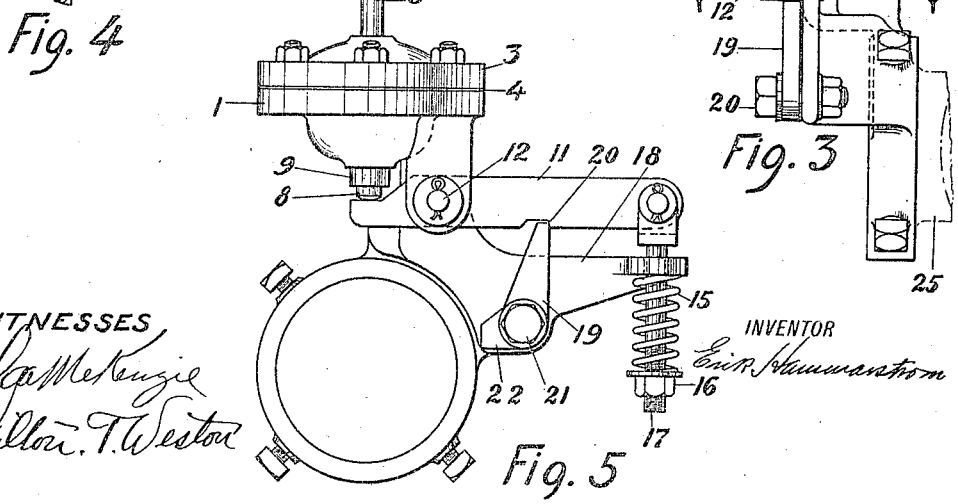
WITNESSES
INVENTOR

UNITED STATES PATENT OFFICE.

ERIK HAMMARSTROM, OF BROOKLYN, NEW YORK.

PRESSURE SAFETY-TRIPPER.

1,304,965.

Specification of Letters Patent. Patented May 27, 1919.

Application filed June 26, 1917. Serial No. 177,037.

*To all whom it may concern:*

Be it known that I, ERIK HAMMARSTROM, citizen of the United States, and resident of 34 Waldorf Court, Brooklyn, in the county of Kings and State of New York, have invented certain new and useful Pressure Safety-Tripper, of which the following is a specification.

My invention relates to improvements in safety trippers wherein the movement of a piston or plunger in a pressure chamber is opposed by a weighted or spring controlled lever, said lever being designed to release a latch when the pressure in the chamber reaches a predetermined point.

The object of my invention is to provide a simple and effective safety tripper to be used in connection with low pressure vessels and the like, which will positively prevent injury to same by automatically operating mechanism which shuts off the pressure before it reaches the danger point, or opens a relief valve.

My invention is fully described in the following specification and clearly shown in the accompanying drawing in which similar reference numbers refer to similar parts in all the views.

Figure 1 is a sectional elevation through my device.

Fig. 2 is a plan view of same.

Fig. 3 is a view substantially on line *x—x* of Fig. 1.

Fig. 4 is taken on line Y—Y of Fig. 3.

Fig. 5 is a view similar to Fig. 1, showing a slight modification wherein a spring replaces the weight in the former view.

In carrying out my invention the body 1 of the device is provided with a web or bracket, 2, which is designed so that it can be mounted on a valve as clearly shown in Figs. 1, 2 and 3. The cap or diaphragm chamber, 3, is attached to the body, 1, by means of bolts shown or in any other approved manner. A piston 7, here shown connected to a diaphragm, 4, is clamped in the position shown in Fig. 1, between the cap 3, and body 1, and receives pressure on its upper side through the pipe, 6, from the vessel to be protected. In the body 1, under the diaphragm 4, is mounted the piston or plunger 7, having a limited vertical movement for the purpose of protecting the diaphragm, 4, against excessive deflections. The plunger, 7, has made integral with it or attached to it an extension or rod, 8, passing through the body, 1. The rod, 8, has attached to it or made integral with it a collar or shoulder, 9, for the purpose of limiting the upward travel of the plunger, 7. The plunger, 7, is also provided with a shoulder, 10, or some similar device, for limiting the downward travel of it. The body, 1, is provided with one or more openings, 5, for the purpose of letting the fluid out or in when the plunger, 7, moves. The rod, 8, acts directly on lever 11, which has a suitably located pivot, 12. The lever, 11, has mounted upon it a weight, 13, which can be fixed in any position by the set screw 14, or by any other reliable device. Instead of a weight, 13, lever 11, may be loaded by a spring, 15, as shown in Fig. 5. The tension of spring 15 can be varied to suit the operating conditions by turning the nut, 16, on bolt 17, which is suitably attached to lever 11. One end of spring 15 bears against the nut, 16, and the other end bears against the arm, 18, which is part of, or otherwise attached to the bracket, 2. The lever, 11, is made so that it can hold a latch or pawl, 19, in the position shown, for instance, by the notch 20, or some similar device. The pawl, 19, is pivoted on the stud 21, which is fastened to bracket 2. The pawl, 19, has an extension, 22, which acts directly against the end of the loaded valve lever 23. The pawl, 19, is prevented from rotating around pivot 21, as long as the former is engaged by the notch, 20, in lever 11. The lever 23 is attached to valve stem 24, and holds the valve 25 open or closed, as the case may be, when the levers are substantially in the position shown. Valve 25 is located in the line supplying pressure to the vessel to be protected, or in the line releasing the pressure.

The operation of the device is as follows: Pipe 6 communicates the pressure from the vessel to be protected to the cap, 3. The weight, 13, is fixed in such a position that it just balances the maximum normal pressure allowed under the cap, 3. When the pressure is at this normal value or at a subnormal value, the relative position of the lever, 11 and all the other parts is then substantially as shown in Fig. 1. If the pressure under the cap, 3, increases beyond its normal value, the diaphragm, 4, will force the plunger, 7, and the rod, 8, down causing the lever, 11, to rotate around the pivot, 12, thereby disengaging the latch, 19, from the notch, 20. This liberates the valve lever, 23.

which immediately closes or opens the valve, 25, shutting off the pressure to or releasing it from the vessel as the case may be. My invention is obviously not limited to the embodiment illustrated in the accompanying drawing.

What I claim is:

1. A pressure fluid tripper combining a pressure chamber, a piston movable in one direction by the force exerted by said pressure, a loaded lever engaging said piston and preventing such movement thereof at normal or subnormal pressures, a latch normally engaged by the lever, a valve communicating with said pressure chamber and relieving said pressure upon movement of the valve from normal position, means tending to move the valve from normal position, the latch preventing such movement of the valve while the lever is in normal position, the movement of the piston upon excessive pressure causing the lever to move and thereby release the latch, whereby said means moves the valve automatically to relieve the pressure.

2. A pressure safety tripper combining a pressure chamber, a piston and piston rod movable in one direction by the force exerted by said pressure, a weighted lever directly engaging said rod and preventing such movement of the piston at normal or subnormal pressures, a latch normally engaged by the lever, a valve communicating with said pressure chamber and relieving said pressure upon movement of the valve from normal position, a loaded lever tending to move the valve from normal position, the latch preventing such movement of the valve while the first lever is in normal position, the movement of the piston upon excessive pressure causing the first lever to move and thereby release the latch, whereby said second lever moves the valve automatically to relieve the pressure.

3. A pressure safety tripper combining a pressure chamber, a piston and rod movable in one direction by the force exerted by said pressure, a diaphragm across the piston, a weighted lever directly engaging said rod and preventing such movement of the piston at normal or subnormal pressures, a latch normally engaged by said lever, a valve communicating with said pressure chamber and relieving said pressure upon movement of the valve from normal position, a second weighted lever tending to move the valve from normal position, the latch preventing such movement of the valve while the first lever is in normal position, the movement of the piston upon excessive pressure causing the first lever to move and thereby release the latch, whereby said second lever moves the valve automatically to relieve the pressure.

In testimony whereof I affix my signature in presence of two witnesses.

Signed at New York city, in the county of New York and State of New York, this 23rd day of June, A. D. 1917.

ERIK HAMMARSTROM.

Witnesses:
  I. SIEGELBAUM,
  L. SEIGEL.